United States Patent
Leon

(10) Patent No.: US 6,409,010 B1
(45) Date of Patent: Jun. 25, 2002

(54) SPLIT DRIVE COMPONENT WITH MAINTAINED ALIGNMENT

(75) Inventor: Michael A. Leon, Orlando, FL (US)

(73) Assignee: FMC Corporation, Chicago, IL (US)

( * ) Notice: Subject to any disclaimer, the term of this patent is extended or adjusted under 35 U.S.C. 154(b) by 0 days.

(21) Appl. No.: 09/572,271

(22) Filed: May 17, 2000

(51) Int. Cl.$^7$ .......................... B65G 39/10; B65G 13/02
(52) U.S. Cl. .................. 198/786; 193/35 MD
(58) Field of Search ................ 198/786, 787; 193/35 MD

(56) References Cited

U.S. PATENT DOCUMENTS

| | | | | |
|---|---|---|---|---|
| 1,758,280 A | * | 5/1930 | Evans | 198/842 X |
| 3,590,970 A | | 7/1971 | Kornylak | 193/37 |
| 3,657,779 A | * | 4/1972 | Granberry | 198/842 |
| 3,923,150 A | | 12/1975 | Jager | 198/780 |
| 4,348,150 A | | 9/1982 | Inghram et al. | 414/529 |
| 4,475,648 A | | 10/1984 | Weeks | 198/830 |
| 4,681,203 A | | 7/1987 | Kornylak | 193/35 R |
| D294,074 S | | 2/1988 | Sogge | D34/29 |
| 4,907,692 A | | 3/1990 | Sogge | 198/780 |
| 4,978,272 A | * | 12/1990 | Leon | 193/35 MD |
| 4,981,209 A | | 1/1991 | Sogge | 198/786 |
| 4,993,540 A | | 2/1991 | van Capelleveen | 198/779 |
| 5,064,045 A | | 11/1991 | Leon | 193/35 MD |
| 5,074,405 A | * | 12/1991 | Magolske et al. | 193/35 MD |
| 5,096,050 A | | 3/1992 | Hodlewsky | 198/779 |
| 5,261,526 A | | 11/1993 | Rombouts | 198/789 |
| 5,378,203 A | | 1/1995 | Baebel | 474/96 |
| 5,396,977 A | * | 3/1995 | Lantis et al. | 198/786 X |
| 5,404,984 A | | 4/1995 | Hagman | 193/35 MD |
| 5,642,800 A | | 7/1997 | East | 193/37 |
| 5,655,642 A | | 8/1997 | Lawrence et al. | 193/37 |
| 5,875,878 A | | 3/1999 | Pierson | 193/37 |
| 6,315,109 B1 | * | 11/2001 | Dean | 193/35 MD |

FOREIGN PATENT DOCUMENTS

| | | | | |
|---|---|---|---|---|
| GB | 2174966 A | * | 11/1986 | B65G/39/10 |
| GB | 2233733 A | * | 1/1991 | B65G/39/10 |
| JP | 0113315 A | * | 1/1989 | B65G/13/02 |
| SU | 1535808 A | * | 1/1990 | B65G/47/53 |

OTHER PUBLICATIONS

Product Brochure, "*The Revvo Cargocaster,*" An Innovative Solution to Air Cargo Handling, Revvo Castor Company, Ltd., two pages, 1994.

Product Brochure, "*Moving in the Right Direction, Castors and Wheels,*" Revvo Castor Company, Ltd., seven pages, 1994.

* cited by examiner

*Primary Examiner*—Stephen T. Gordon
*Assistant Examiner*—Patricia Engle
(74) *Attorney, Agent, or Firm*—Wood, Herron & Evans, L.L.P.

(57) ABSTRACT

A shaft mounted drive component, such as a cluster roller assembly, includes a body member having first and second half members and an opening defining a central axis through which a shaft is received for mounting the body member on a shaft. The first and second half members are divided by a cut forming a gap along the central axis. Alignment holes are split by the cut. A spacer pin is received within each alignment hole and is substantially the same diameter and has a diameter larger than the gap to maintain alignment and positioning of the half members and rollers as before splitting into respective first and second half members and facilitating replacement of first and second half members on a shaft, thus eliminating the need for shaft removal.

19 Claims, 6 Drawing Sheets

SPLIT DRIVE COMPONENT WITH MAINTAINED ALIGNMENT

FIELD OF THE INVENTION

This invention relates to shaft mounted drive components, and more particularly, this invention relates to a shaft mounted cluster roller assembly used in material handling applications.

BACKGROUND OF THE INVENTION

Cluster roller assemblies are used in container translating and orienting apparatus, such as disclosed in U.S. Pat. Nos. 4,981,209 and 5,064,045 assigned to FMC Corporation, the disclosures which are hereby incorporated by reference in their entirety. In these types of apparatus, the movement of flat bottomed articles is controlled in a plurality of different directions relative to a supporting platform. The article is supported on a plurality of clusters of helically mounted, freely rotatable rollers mounted on a plurality of shafts. The different shafts or groups of shafts lie in one of a plurality of zones and are selectively driven in a clockwise direction, a counter-clockwise direction, or held stationary. Selective control of various drive shafts enables the apparatus to move an article parallel to the longitudinal axis of the platform in two selected directions, perpendicular to the longitudinal axis in two selected directions, diagonally of the longitudinal axis in four selected directions, and either clockwise or counter-clockwise about an axis normal to the flat bottom of the article.

About one-half to one percent of all cluster roller assemblies will eventually require field replacement because of collisions with fork lift tines, damaged Unit Load Devices (ULD's) or an inherent manufacturing defect. Typically, the cluster roller assemblies are formed as one-piece, integrally cast, aluminum support or body members having a central hub and peripheral end flanges with support legs that support rollers at roller support positions defined by the support legs along the periphery.

The rollers are set at an angle of about 45° relative to a central axis defined by an opening within the hub of the support member. A drive shaft is received through the openings, and a locking pin or drive pin supported by the drive shaft engages the support member and retains the support member in position on the drive shaft. The conveyor includes walk plates, drive shafts, chains, bearings, tensioners, drive pins, and adjacent cluster roller assemblies on the same drive shaft that have to be removed to obtain access to the broken cluster roller assembly.

Each component must then be reinstalled and the chains tensioned. This process can take hours for a one casting replacement, i.e., cluster roller assembly replacement. As a result, many cluster roller assemblies are not repaired. Also, because of the severe stresses involved, prior art techniques have not always been advantageous, such as splitting the cluster roller assembly along the hub. Even if a cluster roller assembly is split along the hub, the hub would still have to be slid onto a drive shaft, as compared to a cluster roller assembly that was split, such as by sawing, along a central axis defined by the opening that receives a drive shaft. However, when an integrally cast, one-piece support member is split in half, then the alignment and positioning of the half members and rollers is no longer maintained unless additional components or methods are used to maintain the alignment and positioning. For example, a saw kerf would remove some small amount of material, but that material loss would be enough to lose the accuracy and alignment of the rollers, support legs and other components.

SUMMARY OF THE INVENTION

The present invention is advantageous and now permits a shaft mounted drive component to be readily replaced onto a drive shaft or other shaft by placing two split half members and laterally moving them together over the shaft and securing the members together. Alignment and positioning is maintained.

In one aspect of the present invention, a shaft mounted drive component includes a body member having first and second half members and an opening defining a central axis through which a shaft is received for mounting the body member on the shaft. The first and second half members are divided by a gap, such as produced by sawing and forming a gap along the central axis. The body member has a plurality of alignment holes split by the cut. A spacer pin is received within each alignment hole and is substantially the same diameter as each alignment hole. The spacer pin also has a diameter larger than the formed gap to maintain alignment and positioning of the half members and rollers as before splitting and facilitating replacement of first and second half members on a shaft.

In another aspect of the present invention, the body member forms a cluster roller assembly and includes a plurality of rollers mounted thereon and disposed at an acute angle relative to the axis of rotation. The body member also includes a circumferential periphery having roll support positions at which the rollers are supported. At least one fastener retains the first and second half members together. The fastener can be ring-shaped and positioned adjacent the opening through which a shaft is received.

In yet another aspect of the present invention, a conveyor permits selective translation or rotation of a flat bottomed article and includes a frame and a plurality of drive shafts rotatably mounted on the frame and positioned substantially parallel to each other. Each drive shaft includes a plurality of cluster roller assemblies mounted thereon. Each cluster roller assembly has a plurality of rollers rotatably mounted along the periphery and disposed at an acute angle relative to the axis of rotation. The cluster roller assemblies each comprise a roller support member having an opening defining a central axis through which a drive shaft is received, and peripheral roller support positions where the rollers are mounted. The roller support member further comprises first and second half members divided along the central axis. At least one fastener retains first and second roller support members together. A motor is connected to rotatably drive each support shaft in both directions.

An end pin acts as a locking or drive pin and interconnects each cluster roller assembly and drive shaft for locking the cluster roller assembly in a predetermined position on the drive shaft. Each roller support member is split into first and second half members by the cut and includes a plurality of alignment holes split by the cut. A spacer pin is received within each alignment hole and is substantially the same diameter and has a diameter larger than the gap formed by the cut or "kerf" to maintain alignment and positioning of the half members and rollers. A controller can be connected to the motor for causing the motor to rotate in a desired direction so that an article is translated in a desired direction to the drive shafts. Walk plates define a planar surface and a portion of the cluster roller assemblies extend upward beyond the walk plates to engage an article.

In yet another aspect of the present invention, a method is disclosed of forming a drive component for ready replacement onto a shaft and maintaining the positioning of the drive component and associated parts. The method comprises the step of providing an integral one-piece body member having an opening that defines a central axis through which a shaft is received. A plurality of alignment holes are drilled into the body member in a coplanar configuration and aligned with the central axis. The body member is divided via a cut along the opening and through the alignment holes into first and second half members. During replacement, the half members are aligned along the drive shaft and spacer pins are inserted within each alignment hole. Each spacer pin has the same diameter as the alignment hole and is greater in diameter than the width of the gap formed by the cut, i.e., material that has been removed, to maintain alignment and positioning of the first and second half members and rollers as before splitting. The half members are then secured together, such as by ring fastener.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous because it now provides a shaft mounted drive component, such as a cluster roller assembly, to be easily mounted onto a drive shaft without drive shaft removal. This is achieved by applying first and second half members laterally onto the shaft and in the case of a cluster roller assembly, mounting an opposite pair of rollers as the first and second half members come together and then securing the members together. Although the present description will proceed with reference to a cluster roller assembly, the present invention is applicable with any shaft mounted drive component that requires alignment and positioning, and ready replacement onto a drive shaft.

The cluster roller assembly of the present invention is formed from a roller support member that has been split in half from an integral one-piece cast aluminum member. Although sawing is one method of splitting the cast part into component half members, other techniques can be used as known to those skilled in the art. In order to retain the orientation and positioning of half members and rollers, a series of alignment holes that had been previously drilled each receive a spacer pin (when the two half members are together again) that is substantially the same diameter as the alignment hole and a diameter larger than a gap formed by a cut to maintain alignment and positioning such as before splitting.

Figure 1:
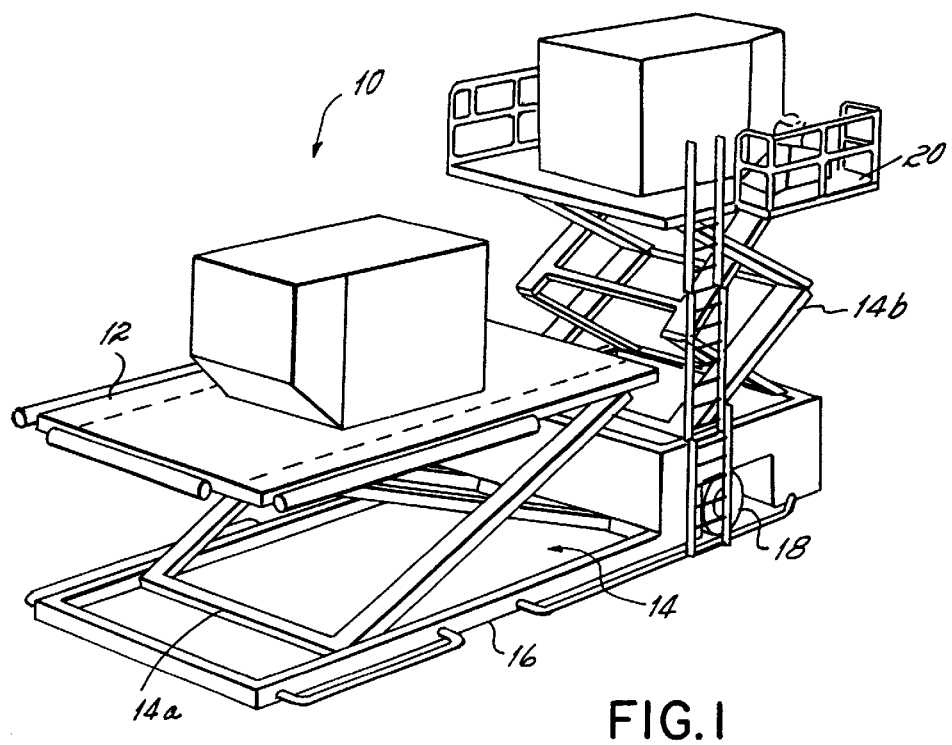
FIG. 1 is an isometric view of a container/pallet loader platform having drive shafts where the cluster roller assemblies are mounted on the drive shafts.

Referring now to FIG. 1, there is illustrated a universal container/pallet loader at 10 that incorporates the roller cluster assembly and method of the present invention. The illustrated container/pallet loader 10 is only one type of loader design that could be used with the present invention. The illustrated universal loader design is manufactured and sold by FMC Corporation of Orlando, Fla., commonly under the trade designation, Commander 15.

As illustrated, the loader 10 includes a conveyor platform 12 of the present invention that is supported on a scissors lift mechanism 14 and actuated by a drive mechanism (not shown) contained within a motor and drive housing 16. The main frame 16 supporting the scissors lift mechanism 14 is supported on wheel modules 18 that provide a small turning radius, along with excellent stability and long-distance driveability. In the illustrated universal loader 10, the scissors lift mechanism 14 includes front and rear lift mechanisms 14a, 14b, supported on the main frame 16. A powered operator platform 20 is moveable with the front scissors lift 14b. The wheel modules 18 include smaller wheels under the rear frame (not shown) and larger wheels in the front that are steerable from the powered operator platform 20.

Figure 2:
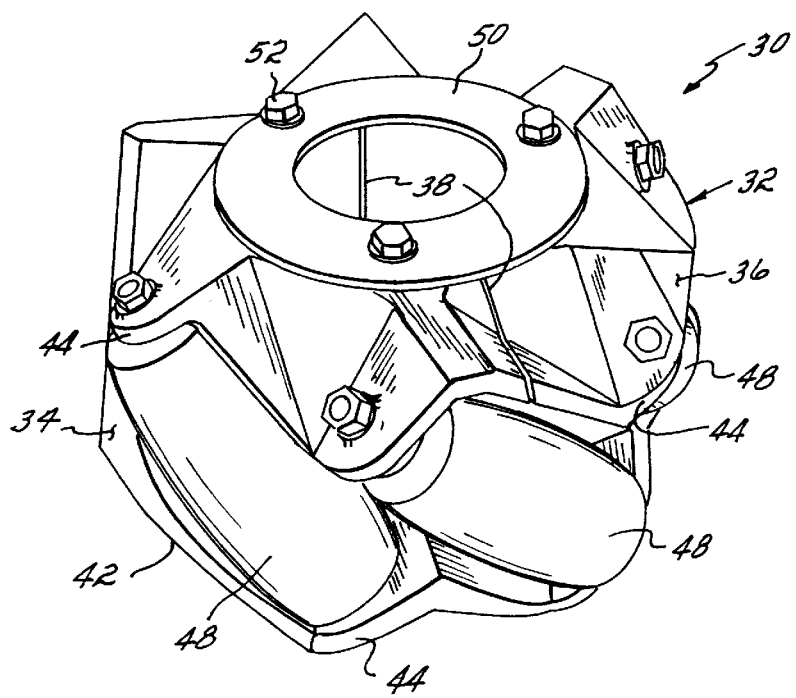
FIG. 2 is an isometric view of a cluster roller assembly of the present invention having a roller support member with first and second half members and rollers supported along the periphery.

FIG. 2 illustrates an isometric view of the cluster roller assembly 30 of the present invention. Although a cluster roller assembly 30 is described, any shaft mounted drive component having a body member with first and second half members and an opening defining a central axis through which a shaft is received for mounting the body member on the shaft could be used. For purposes of description, the cluster roller assembly is described as having a roller support member that corresponds to a body member of a shaft mounted drive component.

Figure 5:
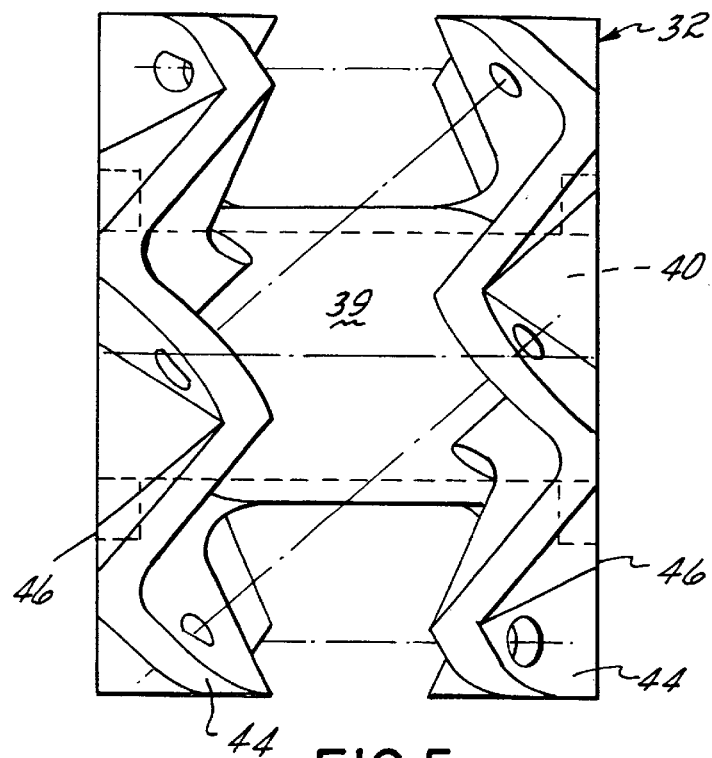
FIG. 5 is a schematic, elevation view of the roller support member of the present invention before it is cut into first and second half support members.
Figure 6:
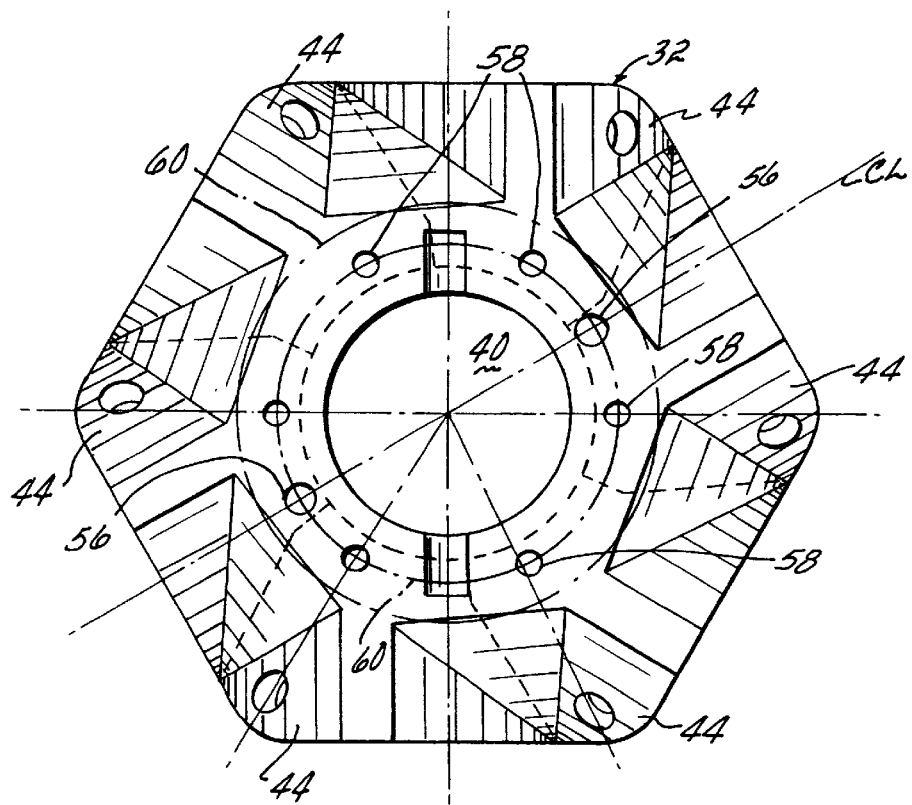
FIG. 6 is another view of the roller support member before it is cut into first and second half members, but showing a cut line CL.
Figure 7:
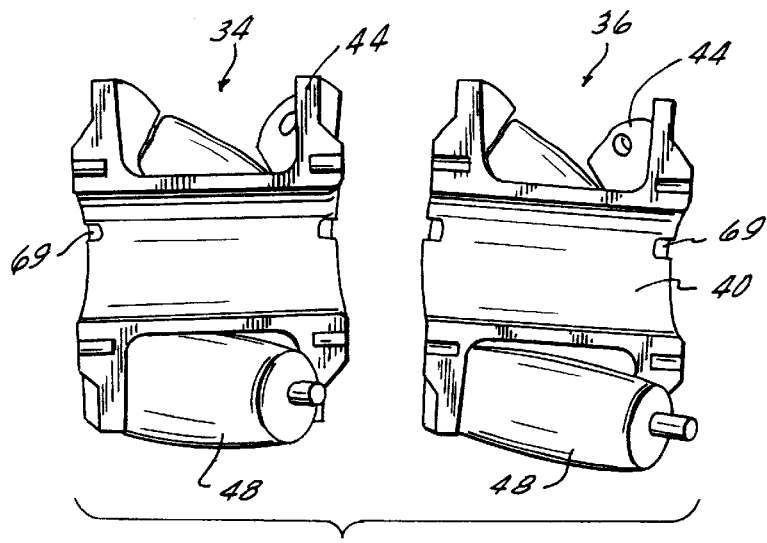
FIG. 7 is a sectioned view of a cluster roller assembly that has been split in half.
Figure 13:
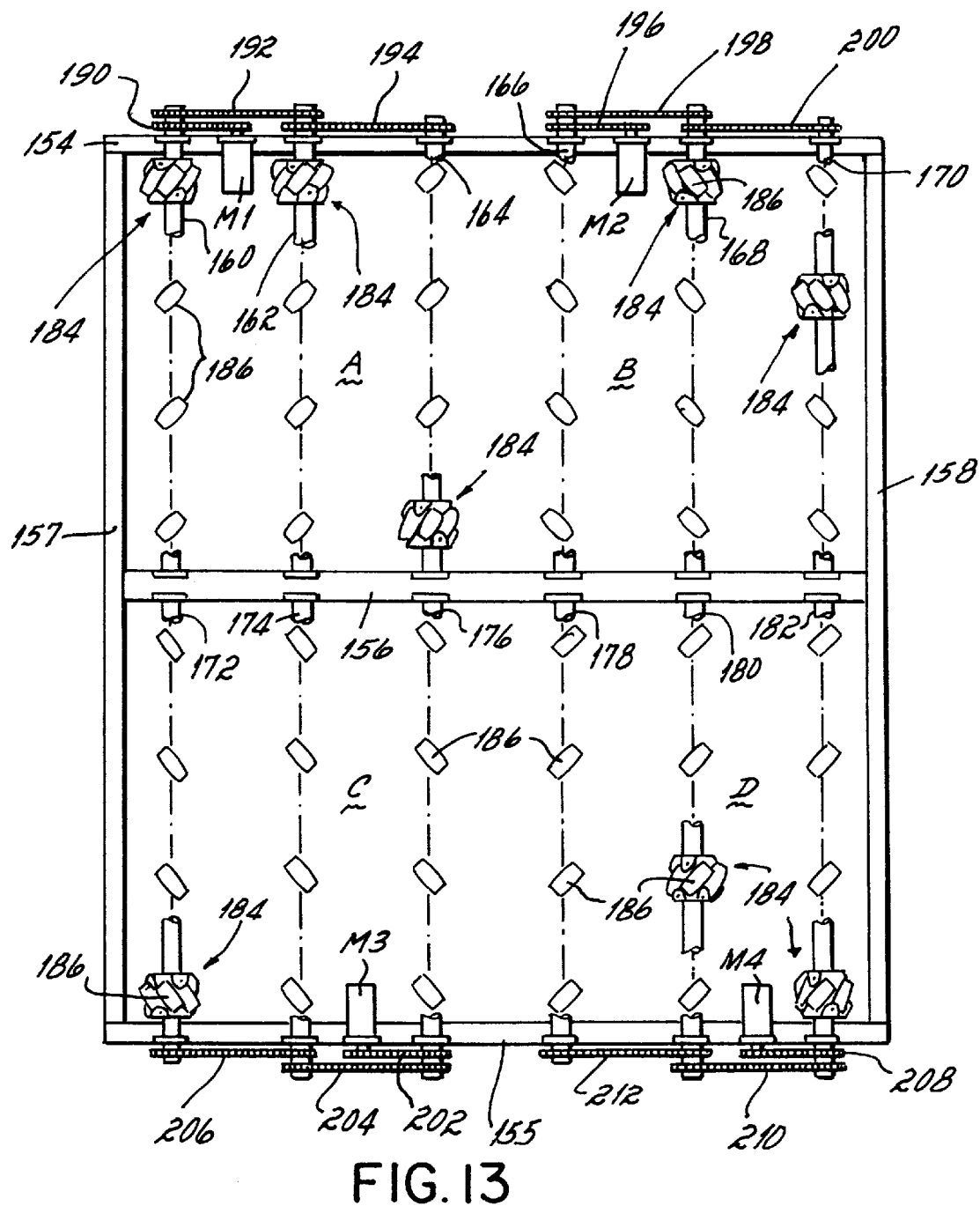
FIG. 13 is a top plan view of an example of a loader platform showing in operation various drive shafts and cluster roller assemblies.

The roller support member 32 is split into two parts and formed as first and second half members 34,36. The first and second half members 34,36 are separated by a cut 38 that extends through the roller support member 32 as shown in FIGS. 2–6, where the cut line (CL) forming the cut in FIG. 6 is illustrated by the dark, heavy bold line. The roller support member 32 includes a central hub 39 having an opening 40 that defines a central axis and is also formed as part of the hub, as shown in FIG. 5. A drive shaft will be received through the opening, such that the roller support member mounts on the drive shaft (FIG. 13). A plurality of roller support positions 42 define a periphery, and in one aspect of the invention, each roller support position is defined by a pair of support legs 44 that are integrally formed with a circumferentially extending end flange member 46 at either end of the hub 39. The support legs 44 support rollers 48 in an orientation where the rollers are disposed at an acute angle relative to the axis of rotation, and in one aspect, are set at an angle of about 45° relative to the central axis as shown in FIG. 2.

Figure 3:
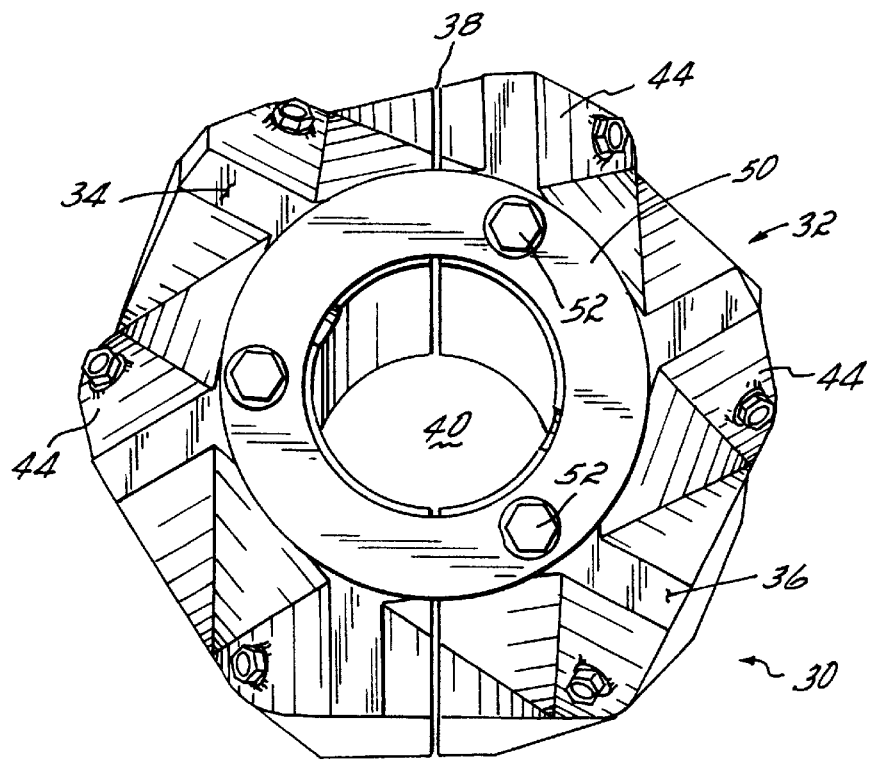
FIG. 3 is a top plan view of the cluster roller assembly of FIG. 2 looking down into the opening that receives the drive shaft.
Figure 4:
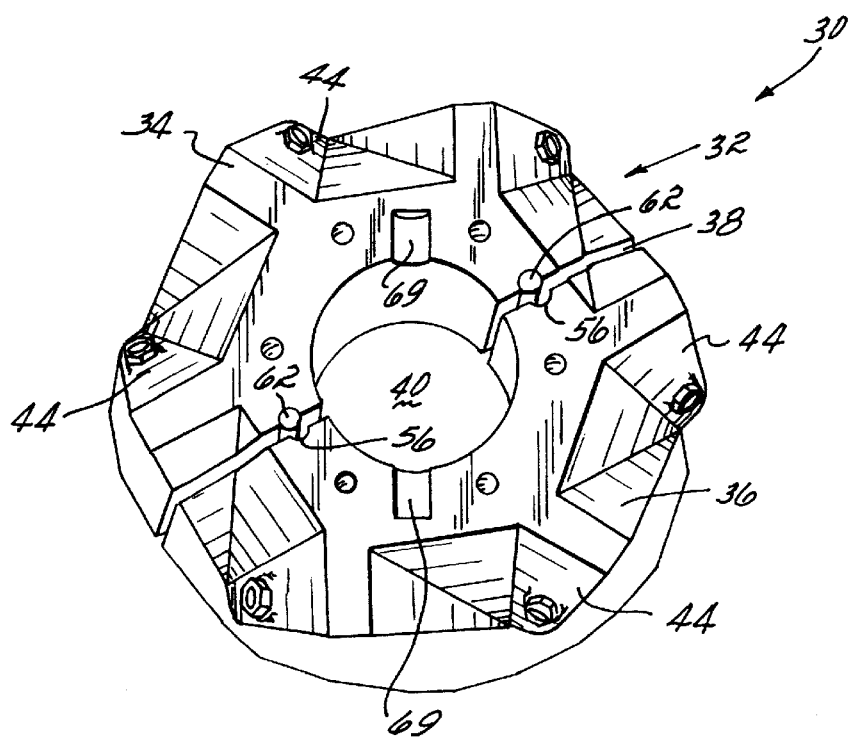
FIG. 4 is another view similar to FIG. 3, but having the ring fastener removed and showing the formed pin receiving slot for receiving the locking pin.
Figure 11:
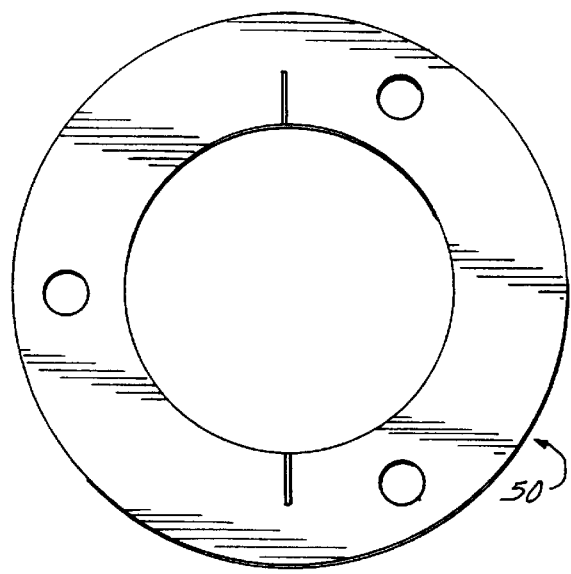
FIG. 11 is a plan view of a ring fastener.
Figure 12:
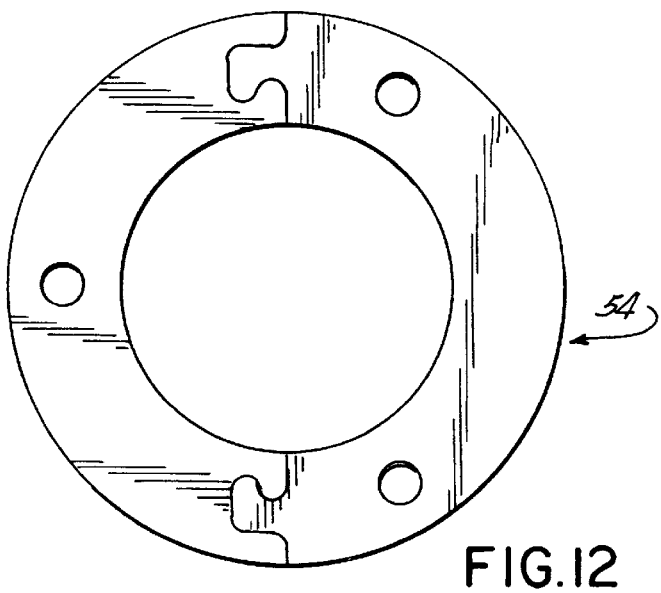
FIG. 12 is a plan view of a ring fastener made from two semicircular interlocking parts.

The first and second half members 34,36 are held together by a ring fastener 50 as shown in FIGS. 2, 3 and 11, which attaches by bolts 52 onto the end flange member 46 of the roller support member. Alternatively, the ring fastener 50 can be formed as semicircular split ring fastener members 54 that interlock as shown in FIG. 12. The roller support member 32 is initially formed as a cast aluminum, one-piece body member with a cental opening formed in the hub. The diameter and cast orientation of the roller support positions are defined by the support legs and opening diameter. The roller support member, when in the pre-cut, cast, one-piece configuration, has the proper orientation and positioning of support legs and hole diameter, thus allowing proper alignment of the rollers 48 relative to a drive shaft. However, when the one-piece cast body member is cut in half, the cut 38, whether produced by a mechanical saw or other cutting means, removes material such that the alignment and orientation, which is critical between the support legs 44 and the central axis, are no longer adequate. It is important to maintain the proper alignment and opening diameter and relative positioning among the support legs 44 to ensure proper orientation and positioning of all parts, including rollers.

In accordance with the present invention, 30 before the first and second half members 34,36 are formed by sawing the integral, one-piece roller support member in half, alignment holes 56 are drilled within the roller support member at the positions indicated in FIG. 6. In a specific type of cluster roller assembly as shown in FIGS. 5 and 6, one alignment hole 56 is drilled partially through a casting midway between two bolt holes 58 and at roughly the same bolt circle 60. Another alignment hole 56 is drilled directly opposite on the same diameter bolt circle 60. Two more alignment holes 56 are drilled on other hub ends of the casting, which are directly below or in line substantially with the first two alignment holes. The casting is then cut or divided by other means on a line halfway between the original two bolt holes 58, which pass through all of the alignment holes 56.

After drilling alignment holes and cutting the cast member in half, the first and second half members 34,36 are maintained as a matched set by first placing a spacer pin 62 into each of the four alignment holes 56. The spacer pins 62 will each have diameters that match the alignment hole diameters as drilled. The spacer pin 62 diameter will also be greater than the thickness of the material removed from the casting, i.e., the gap thickness as produced by the cutting action. The length of each spacer pin will be equal to or slightly less than the depth that the holes were drilled. The ring fasteners positioned on either end of the roller support member at the hub ends use the same bolts as used in production. The spacer pins are also retained and captured between the fastener ring and bottom of each of the blind alignment holes. It is possible to use the solid, one-piece ring fastener or the split ring fastener member having two half members as shown in FIG. 12. The cluster roller assembly is assembled with its spacer pins and rollers as in a current one-piece cluster roller assembly.

Figure 8:
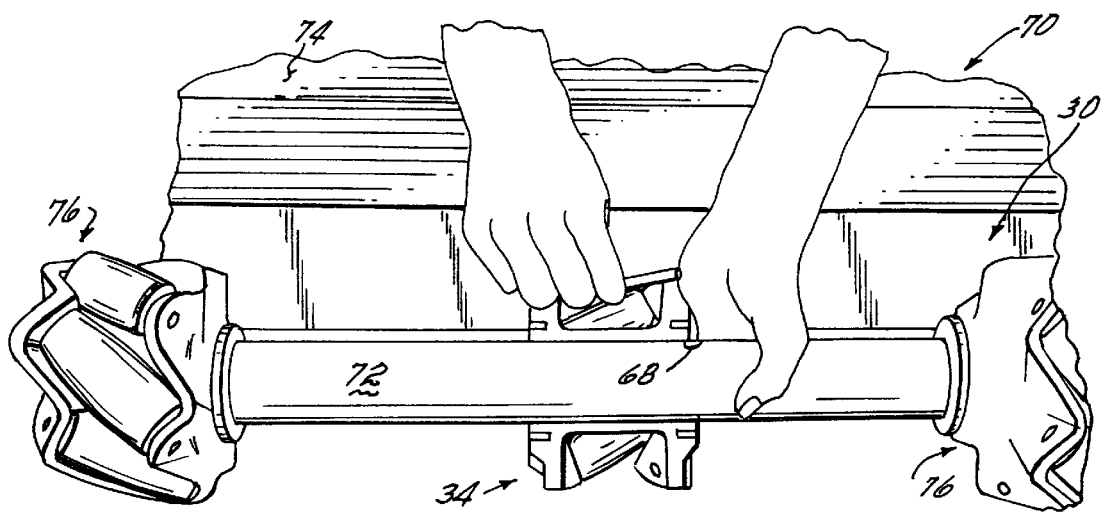
FIGS. 8–10 disclose a sequence of steps for inserting a replacement cluster roller assembly onto the drive shaft.
Figure 9:
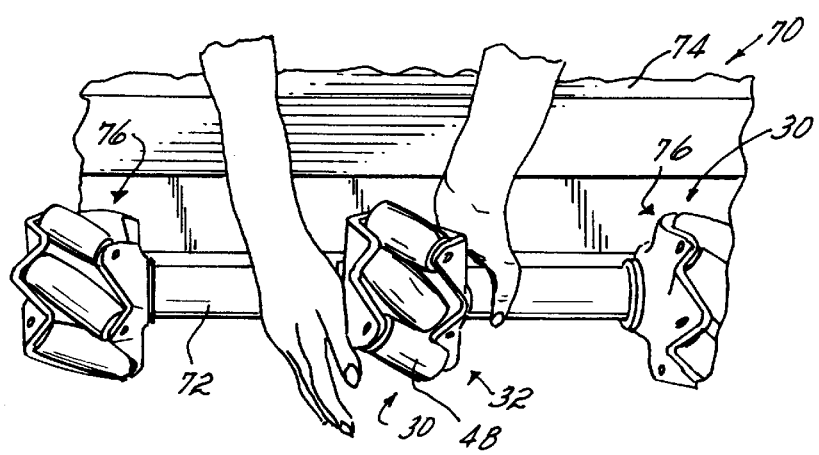
Figure 10:
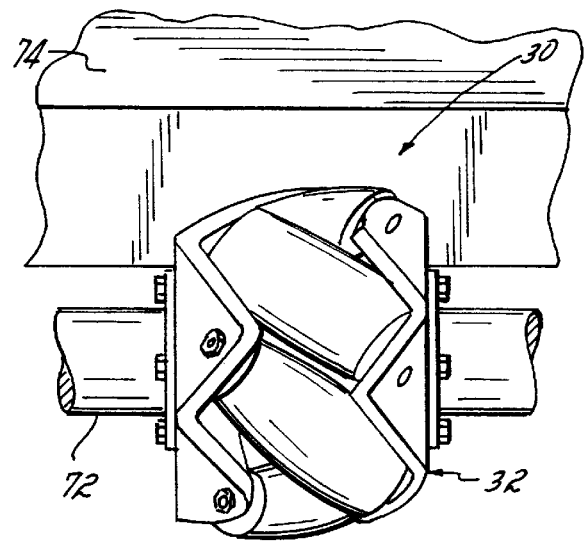

Referring now to FIGS. 8–10, details of the method are shown for replacing a damaged cluster roller assembly with a new cluster roller assembly. When a broken or damaged cluster roller assembly 30 on a platform conveyor 70 must be replaced, a mechanic will first remove the original broken cluster roller assembly. Because it is already damaged, there is no need for the drive shaft 72 to be removed. For example, the cluster roller assembly 30 could be cut with an oxygen/acetylene torch from a drive shaft. It may be necessary to remove a walk plate 74, as shown in FIG. 8, where a walk plate has been removed and two other cluster roller assemblies 76 are shown positioned on either side of a cluster position, where a new cluster roller assembly is being mounted on the drive shaft. Before this stage is reached, however, a mechanic obtains a replacement cluster roller assembly and removes the bolts from both ends of the cluster roller assembly, removes the ring fasteners and separates first and second half members 34,36. Two rollers become loose and a first half member is placed over the drive shaft as shown in FIG. 8.

Each roller 48 is formed to have a roller shaft received and supported by the support legs. The roller shafts and support legs could be formed in a structure similar to the rollers, roller shafts, and support legs as in U.S. Pat. No. 5,064,045, assigned to FMC Corporation, the disclosure which is hereby incorporated by reference in its entirety. Each roller is barrel shaped and has an outer surface that defines a helical path of engagement with an article. Each roller includes a central bore and a roller shaft. The roller shaft could have a threaded end and flat (not shown) to allow the roller shaft to be readily received within a cluster roller assembly and secured from relating, as set forth in the '045 incorporated by reference patent.

Washers and the rollers are mounted and the second half member 36 is slid onto the shaft while guiding the roller shaft end through the corresponding holes on the opposite half casting forming the first half member (FIG. 9). The casting forming the roller support member is then slid over a locking pin 68 or drive pin (FIG. 8) and the spacer pins are inserted into the mounting holes. The ring fasteners are secured across the end and bolted (FIG. 10) and the walk plate is later placed back onto the conveyor platform. The locking pin 68 is received within locking pin recess 69 formed on the hub ends (FIG. 4), thus locking the assembly 30 relative to the shaft.

FIG. 13 illustrates one example of the conveyor platform 70 having drive shafts that could support a plurality of cluster roller assemblies of the present invention. Although various types of loader configurations can be used, the following description is only one type of example of a loader configuration where different zones having left hand and right hand cluster roller assemblies are used.

One example of the conveyor platform 150 of the present invention includes a frame 152 having side walls 154, 155 and a central wall 156 all of which are secured to end walls 157, 158 and extend longitudinally of the platform. A plurality of drive shafts 160, 162, 164, 166, 168, 170 are journaled between the side wall 154 and the central wall 156. Similarly, drive shafts 172, 174, 176, 178, 180 and 182 are journaled between the side wall 155 and the central wall 156.

A plurality of cluster roller assemblies 184, each have six helical barrel shaped rollers 186, and are rotatably mounted on first and second drive shafts by locking pins. The cluster roller assemblies 184 include right hand clusters and left hand clusters. The left hand cluster roller assemblies are mounted on drive shafts 166, 168, 170, 172, 174, 176; and the cluster roller assemblies on drive shafts 160, 162, 164, 178, 180 and 182 are right hand clusters. Four cluster roller assemblies 184 are mounted on each drive shaft, with certain of the cluster roller assemblies illustrated only by an uppermost one of the rollers 186 in position to engage and support the flat bottom surface of a container, pallet, flat bottomed article or the like.

The cluster roller assemblies 184 on drive shafts 160, 162, 164 all have the axes of their uppermost rollers 186 angled at approximately 45 degree angle to the right relative to the central wall 156 and lie in a container supporting zone A. The axes of the uppermost rollers 186 of the cluster roller assemblies 184 are secured to the drive shafts 178, 180, 182 in zone D are parallel to those in zone A. Similarly, the axes of the upper rollers 186 of the cluster roller assemblies keyed to drive shafts 166, 168, 170 in a zone B; and the axes of the upper rollers 186 keyed to drive shafts 172, 174 and 176 in a zone C are parallel to each other and normal to the axes of the upper rollers 186 in zones A and D. Thus the cluster roller assemblies 184 in zones A and D are right hand clusters, while the clusters in zone B and C are left hand clusters.

As illustrated, a first hydraulic motor M1 in zone A is secured to the platform frame 152 and is connected to drive shaft 160 by a first chain drive 190. A second chain drive 192 connects drive shaft 160 to drive shaft 162, while a third chain drive 194 connects drive shafts 162 and 164 together. Thus, all drive shafts and rollers 186 of zone A will be rotated in the same direction and at the same speed by motor M1 when driven in either direction by a controller. Furthermore, when the motor M1 is driven in a clockwise direction (when observing the drive shafts 160, 162, 164 from the lower end) all of the rollers 186 in zone A rotate clockwise at the same speed; and when driving the motor M1 in a counterclockwise direction all of the rollers in zone A are driven in a counterclockwise direction.

Similarly, an independently controlled reversible hydraulic motor M2 drives drive shafts 166, 168, 170 of zone B through chain drives 196, 198, 200 in the same direction and at the same speed either in a counterclockwise or clockwise direction. A hydraulic motor M3 drives the drive shafts 172, 174, 176 and rollers 186 in zone C at the same speed and in the selected direction by chain drives 202, 204, 206 depending upon the direction of rotation of the motors M3; and a hydraulic motor M4 drives drive shafts 178, 180, 182 and their rollers 186 of zone D through chain drives 208, 210, 212 in the selected direction and at the same speed.

As will be described hereinafter, all of the motors, when driven, will drive the rollers in their zones in the selected direction and at the same speed as the rollers in one or more of the other zones.

Prior to describing the several directions in which a container (or other flat bottomed articles) may be propelled while supported on the rollers 186, it is believed that it would be helpful in understanding the conveyor platform to briefly describe the driving forces exerted by the freely rotatable rollers 186 on the bottom of the containers.

If the motor M1 drives all cluster roller assemblies 184 and thus the rollers in zone A in a clockwise direction, the trailing end of each roller 186 that is in contact with the container, will be moved upwardly into driving contact with the container while the forward ends (i.e., the right ends of the rollers in zone A) will be moved downwardly away from the container. Thus, the driving forces of the rollers in zone A will be parallel with the axes of the freely rotatable rollers and will be directed upwardly to the right as viewed in FIG. 13. If the cluster roller assemblies 184 of rollers 186 in zone A are driven in a counterclockwise direction the driving force against the container would be downwardly and to the left as viewed in FIG. 13.

The several directions in which a container supported on the platform 150 can be driven will now be described.

When it is desired to drive the container to the right all drive shafts in zones A, B, C and D are driven in a clockwise direction (viewed from the bottom of FIG. 13) thus moving the container to the right.

If the container is to be driven to the left, all drive shafts in zones A, B, C and D are driven in a counterclockwise direction.

If the container is to be driven diagonally, upwardly and to the right at a 45 degree angle, all of the drive shafts and their rollers in zones A and D will be driven in a clockwise direction, while the rollers in zones B and C will be held stationary. It will be appreciated that the freely rotatable rollers 186 in zones B and C will provide support but no driving force to the container and will freely roll permitting the container to be driven upwardly and to the right.

If the container is to be driven diagonally downwardly and to the left, the drive shafts and their rollers in zones A and D will be driven in a counterclockwise direction and the drive shafts in zones B and C will be held stationary allowing the supporting rollers in zones B and C to freely roll.

If the container is to be driven diagonally upwardly to the left, the drive shafts in zones B and C are driven in a clockwise direction and the drive shafts in zones A and D are held from rotation.

When the container is to be driven diagonally downwardly and to the right, the drive shafts in zones B and C are driven in a clockwise direction and the drive shafts in zones A and D are held stationary.

When the container is to be driven in a clockwise direction about a vertical axis, the drive shafts in zones A and B are driven in a clockwise direction, and the drive shafts in zones C and D are driven in a counterclockwise direction.

When the container is to be driven in a counterclockwise direction about a vertical axis, the drive shafts in zones A and B are driven in a counterclockwise direction and the drive shafts in zones C and D are driven in a clockwise direction.

When the container is to be driven upwardly, the drive shafts in zones A and D are driven clockwise, and the drive shafts in zones B and C are driven counterclockwise.

When the container is to be driven downwardly, the drive shafts in zones A and D are driven counterclockwise, and the drive shafts in zones B and C are driven clockwise.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A conveyor for moving an article comprising:
a frame;
a plurality of drive shafts rotatably mounted on said frame and positioned substantially parallel to each other, each of said drive shafts including an axis of rotation;

a plurality of cluster roller assemblies mounted with a spaced arrangement on said plurality of drive shafts, each of said cluster roller assemblies having a roller support member and a plurality of rollers rotatably mounted to said roller support member, said roller support member having a first half member, a second half member joined with said first half member, and an opening extending through said first and said second half members, said opening receiving one of said drive shafts and having a central axis aligned with one of said axes of rotation, said first and said second half members bisected along a dividing plane containing said central axis and spaced apart relative to said dividing plane by a gap;

a plurality of alignment holes in said roller support member, each of said alignment holes divided by said gap and aligned with said central axis;

a plurality of spacer pins received within respective ones of said alignment holes; and a motor connected to rotatably drive at least one of said drive shafts relative to said axis of rotation for moving the article on said cluster roller assemblies relative to said frame.

2. The conveyor of claim 1, further comprising a plurality of locking pins, each of said locking pins interconnecting one of said cluster roller assemblies with one of said drive shafts.

3. The conveyor of claim 1, further comprising a controller operatively connected to said motor for causing said motor to rotate in a desired angular direction so that the article is translated in a desired linear direction relative to said drive shafts.

4. The conveyor of claim 3, further comprising a plurality of walk plates that define a planar surface, and wherein a portion of each of said cluster roller assemblies extends upward beyond said plurality of walk plates for engaging the article.

5. The conveyor of claim 1, wherein each of said rollers further comprises:
 a central bore; and
 a roller shaft extending through said central bore.

6. The conveyor of claim 1, wherein each of said rollers includes an outer surface having a substantially barrel shape.

7. The conveyor of claim 1, wherein each of said roller support members further comprises a plurality of roller support positions and a pair of support legs formed at each of said roller support positions, each of said rollers supported by one of said pairs of support legs.

8. The conveyor of claim 1, wherein said motor is capable of rotatably driving at least one of said drive shafts in a first direction relative to said axis of rotation and in a second direction relative to said axis of rotation that differs from said first direction.

9. The conveyor of claim 1, wherein each of said cluster roller assemblies includes at least one fastener for joining said first half member with said second half member.

10. The conveyor of claim 9, wherein said fastener includes an annular ring positionable about one of said shafts and a plurality of bolts attaching said annular ring to said first and said second half members.

11. The conveyor of claim 10, wherein said annular ring is divided into a pair of split ring members that are selectively interlockable, said split ring members capable of being separated for positioning about one of said drive shafts and of being interlocked for joining said first half member with said second half member.

12. The conveyor of claim 1, wherein each of said alignment holes has an inner diameter and each of said spacer pins has an outer diameter, said outer diameter substantially equal to said inner diameter and larger than said gap for maintaining alignment and positioning of said first and said second half members and said rollers by compensating for material removed from said roller support member to provide said gap.

13. A cluster roller assembly for mounting on a shaft rotatable about an axis of rotation, comprising:

a roller support member having a first half, a second half member joined with said first half member, an opening extending through said first and second half members, a plurality of roller support positions and a plurality of rollers each rotatably mounted at one of said roller support positions, said opening capable of receiving the drive shaft and having a central axis aligned with the axis of rotation, said first and said second half members divided along a dividing plane containing said central axis and spaced apart relative to said dividing plane by a gap;

a plurality of alignment holes in said roller support member, each said alignment holes bisected by said gap and aligned with said central axis; and a plurality of spacer pins received within respective ones of said alignment holes.

14. The cluster roller assembly of claim 13, wherein each of said alignment holes has an inner diameter and each of said spacer pins has an outer diameter substantially equal to said inner diameter, said outer diameter larger than said gap for maintaining alignment and positioning of said first and said second half members and said rollers by compensating for material removed from said roller support member to provide said gap.

15. The cluster roller assembly of claim 13, further comprising at least one fastener for joining said first half member with said second half member.

16. The cluster roller assembly of claim 15, wherein said fastener includes an annular ring positionable about one of said shafts and a plurality of bolts attaching said ring fastener to said first and said second half members.

17. The cluster roller assembly of claim 16, wherein said annular ring is divided into a pair of split ring members that are selectively interlockable, said split ring members capable of being separated for positioning about one of said drive shafts and of being interlocked for joining said first half member with said second half member.

18. A method of forming a drive component for ready replacement onto a shaft and maintaining alignment, comprising the steps of:

providing an integral one-piece body member having an opening defining a central axis through which a shaft is received;

drilling a plurality of alignment holes into the body member in a coplanar configuration and aligned with the central axis;

dividing the body member in half via a cut along the opening and the alignment holes into first and second half members;

aligning the half members along a shaft while inserting spacer pins within each alignment hole, each spacer pin having about the same diameter as the alignment hole and greater than the gap formed by the cut to maintain alignment and positioning of the first and second half members and rollers; and securing the half members together.

19. A method according to claim 18, wherein said body member forms a cluster roller and includes a plurality of rollers mounted thereon and disposed at an acute angle relative to the axis of rotation.

* * * * *